(12) United States Patent
Poornachary et al.

(10) Patent No.: US 11,159,400 B2
(45) Date of Patent: Oct. 26, 2021

(54) SYSTEMS AND METHODS FOR OFFLOADING IPFIX LOOKUP AND TRANSLATION OPERATIONS FROM OBSERVATION DOMAINS

(71) Applicant: Juniper Networks, Inc., Sunnyvale, CA (US)

(72) Inventors: Manikandan Musuvathi Poornachary, Sunnyvale, CA (US); Aayush Gupta, Sunnyvale, CA (US); Darshan Hassan Shashikumar, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 105 days.

(21) Appl. No.: 16/672,744

(22) Filed: Nov. 4, 2019

(65) Prior Publication Data

US 2021/0135961 A1 May 6, 2021

(51) Int. Cl.
*G06F 15/173* (2006.01)
*H04L 12/26* (2006.01)
*G06F 16/22* (2019.01)

(52) U.S. Cl.
CPC .............. *H04L 43/04* (2013.01); *G06F 16/22* (2019.01)

(58) Field of Classification Search
None
See application file for complete search history.

(56) References Cited

U.S. PATENT DOCUMENTS

| | | | |
|---|---|---|---|
| 2009/0228586 A1* | 9/2009 | Claise | H04L 43/0894 709/224 |
| 2011/0222413 A1* | 9/2011 | Shukla | H04L 43/0811 370/241.1 |
| 2014/0172947 A1* | 6/2014 | Ghai | H04L 61/2061 709/202 |
| 2014/0304393 A1* | 10/2014 | Annamalaisami | H04L 67/146 709/224 |
| 2016/0065436 A1* | 3/2016 | Disciascio | H04L 67/32 709/224 |
| 2019/0007326 A1* | 1/2019 | Clemm | H04L 41/0893 |
| 2019/0052658 A1* | 2/2019 | Clarke | H04L 63/1425 |
| 2019/0280969 A1* | 9/2019 | Liu | H04L 45/48 |
| 2021/0083941 A1* | 3/2021 | Mutnuru | H04L 47/2483 |

\* cited by examiner

*Primary Examiner* — Brian Whipple
*Assistant Examiner* — Gregory P Tolchinsky
(74) *Attorney, Agent, or Firm* — FisherBroyles, LLP

(57) ABSTRACT

A disclosed method may include (1) receiving, at an IPFIX collector, a IPFIX message from an IPFIX exporter implemented on a remote device, (2) identifying, within the IPFIX message, a data set exported by the IPFIX exporter implemented on the remote device, (3) identifying, within the IPFIX message, a data-level indicator that indicates whether the data set is (A) a primary data set observed by an observation domain implemented on the remote device or (B) a secondary data set derived by an observation cloud implemented on the remote device, (4) identifying, at the IPFIX collector, a database that corresponds to the data-level indicator identified within the IPFIX message, (5) storing the data set in the database in accordance with the data-level indicator, and then (6) performing an action based at least in part on the data set stored in the database. Various other systems and methods are also disclosed.

20 Claims, 10 Drawing Sheets

Secondary Data Set
122

FORMAT:

| First Common Properties Identifier | First Property | Second Property | Third Property | Fourth Property |
|---|---|---|---|---|

| Second Common Properties Identifier | Fifth Property | Sixth Property | Seventh Property | Eighth Property | Ninth Property |
|---|---|---|---|---|---|

DATA SET:

| Ingress Interface Index | Ingress Interface (SNMP ID) | Ingress Interface Name | Ingress VRF ID | Ingress VRF Name |
|---|---|---|---|---|

| Next Hop Index | Egress Interface (SNMP ID) | Egress Interface Name | Next Hop IPv4 Address | Egress VRF ID | Egress VRF Name |
|---|---|---|---|---|---|

*FIG. 7*

Record
800

UNIFIED DATA SET:

| Ingress Interface (SNMP ID) | Ingress Interface Name | Ingress VRF Name | Egress Interface (SNMP ID) | Egress Interface Name | Flow Direction | Forwarding Status | Data Link Size Frame |
|---|---|---|---|---|---|---|---|

*FIG. 8*

SYSTEMS AND METHODS FOR OFFLOADING IPFIX LOOKUP AND TRANSLATION OPERATIONS FROM OBSERVATION DOMAINS

BACKGROUND

The Internet Protocol Flow Information Export (IPFIX) protocol is often used to export data about flows encountered at certain observation points within a network. The exported IPFIX data may provide administrators and/or analysis engines with a real-time glimpse into the innerworkings, composition, and/or traffic information of the network. In some examples, the IPFIX data may be exported by an observation domain that includes a set of observation points. In such examples, the observation domain may reduce redundancy in the exported IPFIX data by deduplicating commonalities found in flows encountered across the observation points.

Unfortunately, the IPFIX protocol may give rise to certain challenges for network equipment manufacturers. For example, to export the IPFIX data, the IPFIX protocol may necessitate and/or rely on certain lookups and/or translations. These IPFIX lookups and/or translations may be very resource intensive and/or demanding. As a result, these IPFIX lookups and/or translations may lead to performance issues. In traditional IPFIX technologies, these IPFIX lookups and/or translations may be performed by the observation domain.

In addition to being very resource intensive and/or demanding, these IPFIX lookups and/or translations may necessitate and/or rely on a complete Forwarding Information Base (FIB). In some examples, a complete FIB may include and/or represent a high number of routes (e.g., one million routes, two million routes, etc.), which collectively consume significant memory resources in the observation domain. As a result, to support the IPFIX protocol in traditional technologies, the observation domain may be limited to implementation on expensive physical devices that include sufficient memory resources.

Although the observation domain may reduce redundancy in the exported IPFIX data by deduplicating commonalities found in flows encountered across the observation points, traditional IPFIX technologies may fail to address and/or account for additional commonalities found across sets of observation domains. These traditional IPFIX technologies may thus be losing a certain amount of efficiency by failing to address and/or account for the additional commonalities found across sets of observation domains. The instant disclosure, therefore, identifies and addresses a need for additional and improved systems and methods for offloading IPFIX lookup and translation operations from observation domains.

SUMMARY

As will be described in greater detail below, the instant disclosure generally relates to systems and methods for offloading IPFIX lookup and translation operations from observation domains. In one example, a method for accomplishing such a task may include (1) receiving, at an IPFIX collector, at least one IPFIX message from an IPFIX exporter implemented on a remote device, (2) identifying, within the IPFIX message, a data set exported by the IPFIX exporter implemented on the remote device, (3) identifying, within the IPFIX message, a data-level indicator that indicates whether the data set is (A) a primary data set observed by an observation domain implemented on the remote device or (B) a secondary data set derived by an observation cloud implemented on the remote device, (4) identifying, at the IPFIX collector, a database that corresponds to the data-level indicator identified within the IPFIX message, (5) storing the data set in the database in accordance with the data-level indicator, and then (6) performing at least one action based at least in part on the data set stored in the database.

Similarly, a system that implements the above-identified method may include a physical processor configured to execute various modules stored in memory. In one example, this system may include and/or execute (1) a collector module that receives at least one IPFIX message from an IPFIX exporter implemented on a remote device, (2) an identification module that (A) identifies, within the IPFIX message, a data set exported by the IPFIX exporter implemented on the remote device, (B) identifies, within the IPFIX message, a data-level indicator that indicates whether the data set is (I) a primary data set observed by an observation domain implemented on the remote device or (II) a secondary data set derived by an observation cloud implemented on the remote device, and (C) identifies, at the IPFIX collector, a database that corresponds to the data-level indicator identified within the IPFIX message, (3) a storage module that stores the data set in the database in accordance with the data-level indicator, and (4) an action module performs at least one action based at least in part on the data set stored in the database.

Additionally or alternatively, a non-transitory computer-readable medium that implements the above-identified method may include one or more computer-executable instructions. When executed by at least one processor of a computing device, the computer-executable instructions may cause the computing device to (1) receive, by an IPFIX collector, at least one IPFIX message from an IPFIX exporter implemented on a remote device, (2) identify, within the IPFIX message, a data set exported by the IPFIX exporter implemented on the remote device, (3) identify, within the IPFIX message, a data-level indicator that indicates whether the data set is (A) a primary data set observed by an observation domain implemented on the remote device or (B) a secondary data set derived by an observation cloud implemented on the remote device, (4) identify, at the IPFIX collector, a database that corresponds to the data-level indicator identified within the IPFIX message, (5) store the data set in the database in accordance with the data-level indicator, and then (6) perform at least one action based at least in part on the data set stored in the database.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 7 is an illustration of an exemplary secondary data set.

FIG. 8 is an illustration of an exemplary record that unifies a primary data set and a secondary data set.

Figure 1:
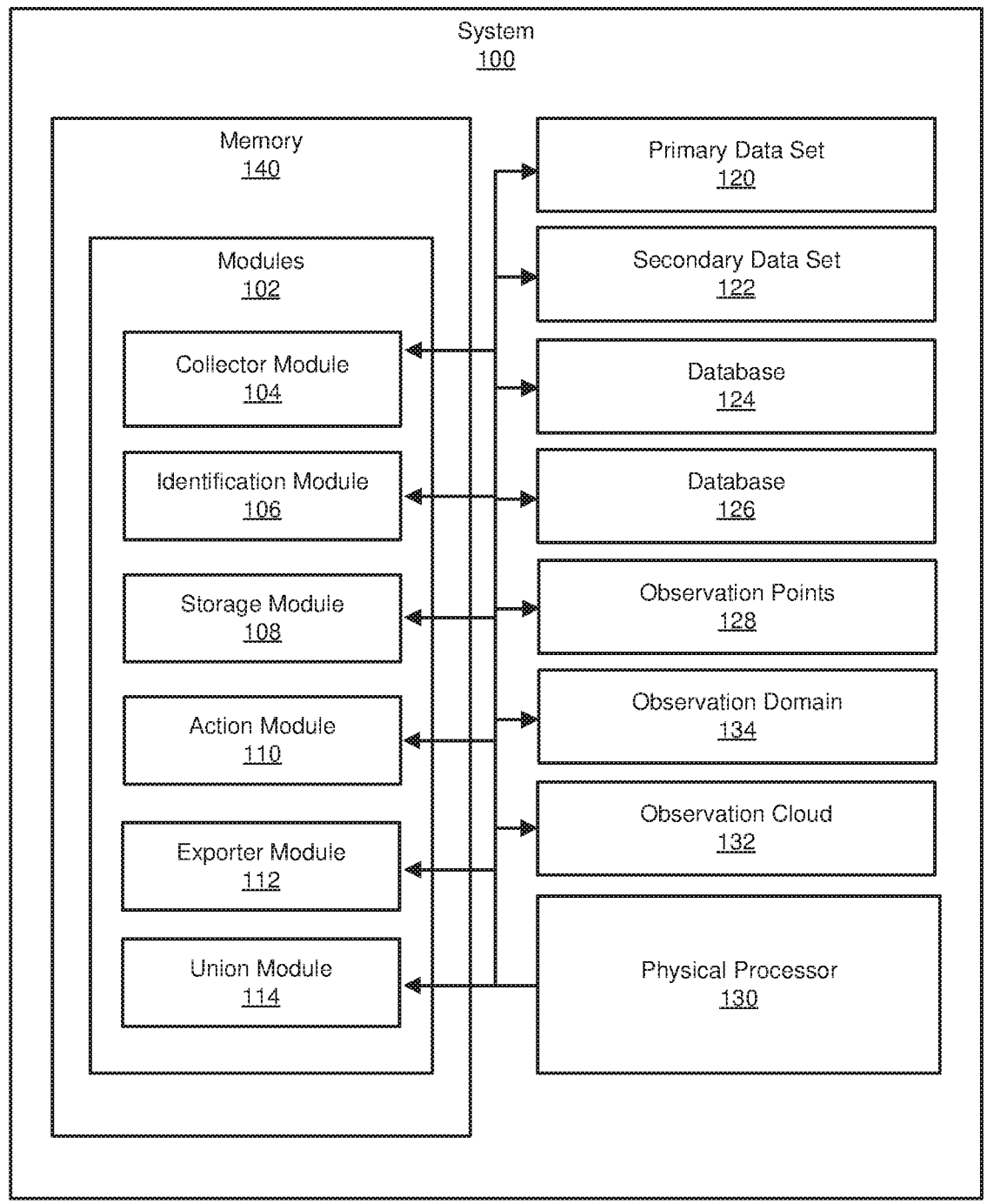
FIG. 1 is a block diagram of an exemplary system for offloading IPFIX lookup and translation operations from observation domains.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for offloading IPFIX lookup and translation operations from observation domains. As will be explained in greater detail below, embodiments of the instant disclosure may implement an observation cloud that supports the IPFIX protocol. In some examples, the observation cloud may include and/or represent a set of observation domains each with various observation points. In such examples, the duties of exporting data to an IPFIX collector may be divided among the observation domains and the observation cloud in such a way that the observation domains need not perform lookup or translation operations in connection with IPFIX data exports.

Since, in these examples, the observation domains need not perform lookup or translation operations in connection with IPFIX data exports, the observation domain may be able to support the IPFIX protocol without a complete FIB. As a result, network equipment manufacturers may design and/or provide IPFIX-supported devices that are able to implement observation domains with less memory capacity than traditional IPFIX technologies.

As an example, a router may include a set of line cards installed to a routing engine. In this example, the line cards may implement a set of observation domains, and the routing engine may implement an observation cloud that interfaces with the observation domains. To achieve a workable division of duties for exporting data to an IPFIX collector, each observation domain may discover and/or export observable properties of various flows encountered by that domain's observation points. Such observable properties of the flows may include and/or represent any metadata, attributes, characteristics, and/or fields that are discoverable by simple inspections of the flows' packets. Accordingly, each observation domain may be responsible for exporting the observable properties of the flows to the IPFIX collector.

For the purposes of the present disclosure, the observable properties of the flows may be distinguished from derivable properties of the flows. The derivable properties may necessitate a lookup and/or a translation, whereas the observable properties may be discovered without a lookup or a translation. In this example, the observation cloud, as opposed to the observation domains, may discover and/or export the derivable properties of the flows encountered across the observation points of the various observation domains. Such derivable properties of the flows may include and/or represent any metadata, attributes, characteristics, and/or fields that necessitate one or more lookup and/or translation operations for discovery. Accordingly, the observation cloud may be responsible for exporting the derivable properties of the flows to the IPFIX collector.

In this example, a remote device may implement the IPFIX collector, which receives the IPFIX exports from the observation cloud and the various observation domains. At the remote device, the IPFIX collector may distinguish between the IPFIX exports originating from the observation cloud and the IPFIX exports originating from the observation domains. The IPFIX collector may thus store the IPFIX exports from the observation cloud in one database and the IPFIX exports from the observation domains in another database. The IPFIX collector may then unify, combine, and/or join the IPFIX exports from the one database with the corresponding IPFIX exports from the other database based at least in part on one or more common identifiers shared by those IPFIX exports. The resulting unification of IPFIX exports may include and/or represent a complete set of IPFIX data for the flows in question.

In this example, the IPFIX collector may perform and/or facilitate certain actions and/or services based at least in part on the unification of IPFIX exports. For example, the complete set of IPFIX data for a specific flow may be used by the IPFIX collector and/or another device or component to facilitate certain network services, such as traffic metering, traffic profiling, security evaluations, intrusion detection, accounting, and/or billing, among others.

Figure 2:
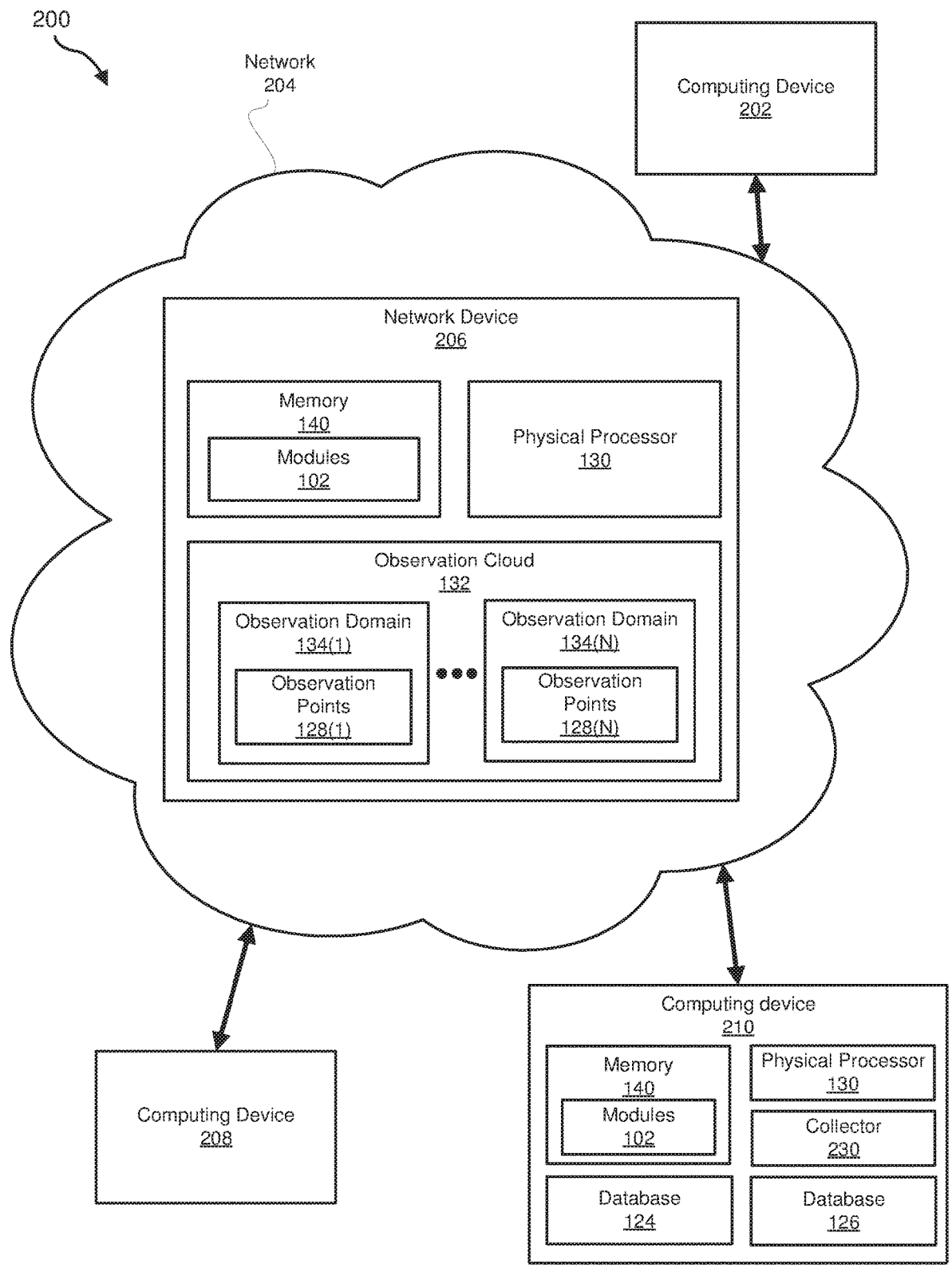
FIG. 2 is a block diagram of an additional exemplary system for offloading IPFIX lookup and translation operations from observation domains.
Figure 3:
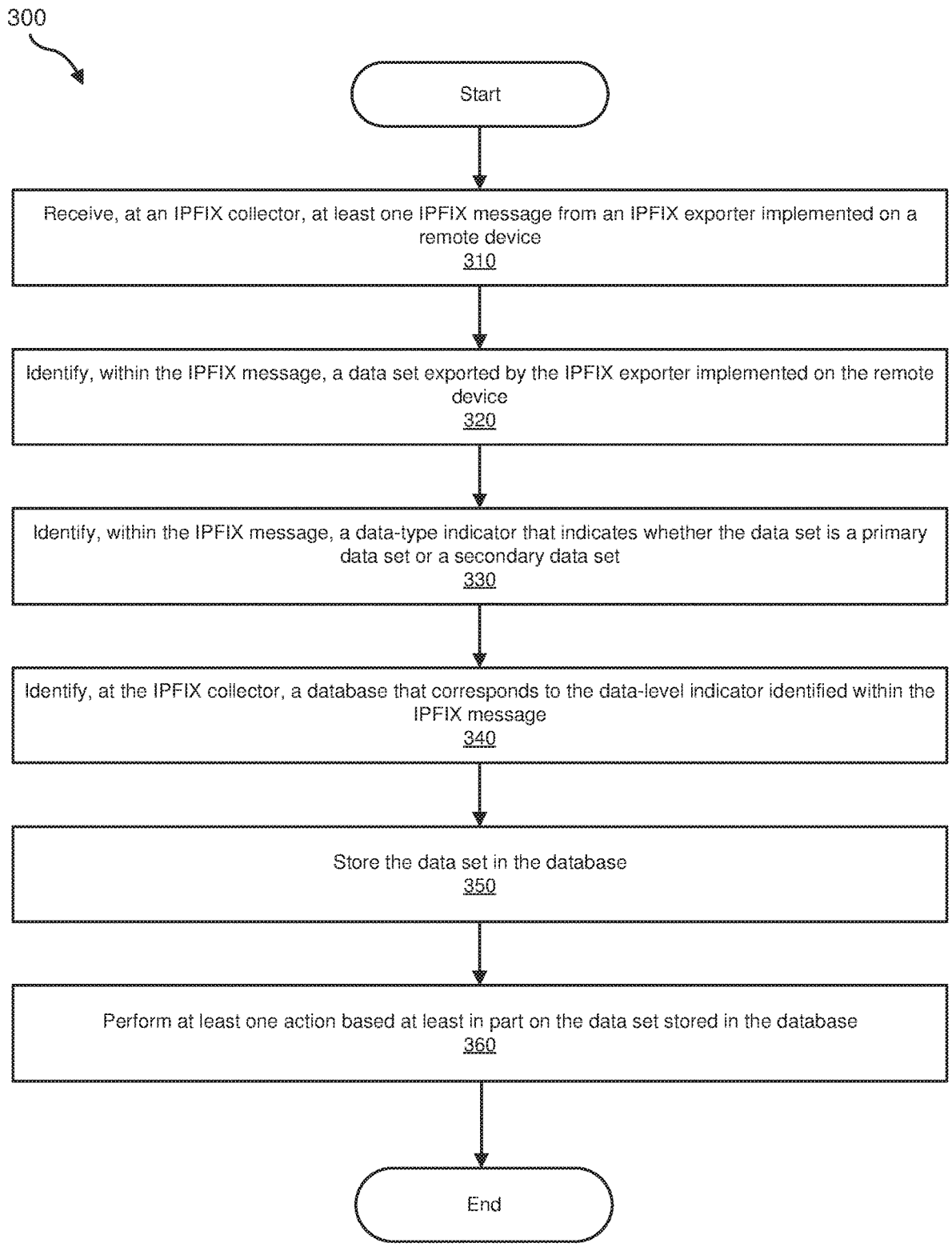
FIG. 3 is a flow diagram of an exemplary method for offloading IPFIX lookup and translation operations from observation domains.
Figure 4:
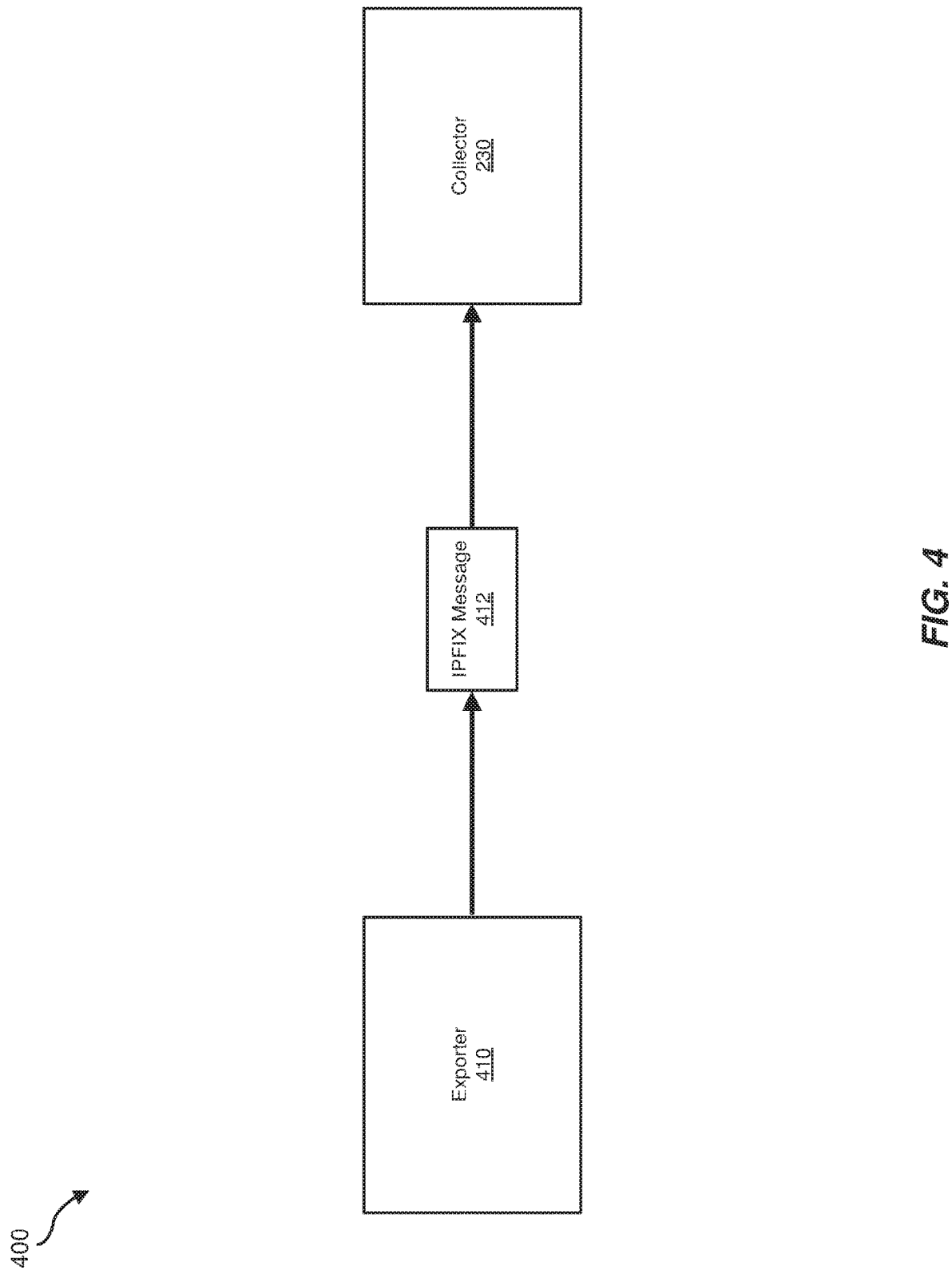
FIG. 4 is a block diagram of an additional exemplary system for offloading IPFIX lookup and translation operations from observation domains.

The following will provide, with reference to FIGS. 1, 2, and 4 detailed descriptions of exemplary systems and corresponding implementations for offloading IPFIX lookup and translation operations from observation domains. Detailed descriptions of exemplary IPFIX messages, primary data sets, secondary data sets, and/or unified data records will be provided in connection with FIGS. 5, 6, 7, and 8, respectively. Detailed descriptions of computer-implemented methods for offloading IPFIX lookup and translation operations from observation domains will be provided in connection with FIGS. 3 and 9. In addition, detailed descriptions of an exemplary computing system for carrying out these methods will be provided in connection with FIG. 10.

FIG. 1 shows an exemplary system 100 that facilitates offloading IPFIX lookup and translation operations from observation domains. As illustrated in FIG. 1, system 100 may include one or more modules 102 for performing one or more tasks. As will be explained in greater detail below, modules 102 may include a collector module 104, an identification module 106, a storage module 108, an action module 110, an exporter module 112, and/or a union module 114. Although illustrated as separate elements, one or more of modules 102 in FIG. 1 may represent portions of a single module, application, and/or operating system.

In certain embodiments, one or more of modules 102 in FIG. 1 may represent one or more software applications or programs that, when executed by a processor of a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202, computing device 208, computing device 210, and/or network device 206) and/or the devices in FIG. 4 (e.g., exporter 410 and/or collector 230). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate offloading IPFIX lookup and translation operations from observation domains. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more data sets, such as primary data set 120 and/or secondary data set 122. In some examples, primary data set 120 may include and/or represent data observed, sampled, and/or identified by the data path, data plane, and/or forwarding plane of a network device. In one example, primary data set 120 may include, represent, and/or identify one or more common properties and/or elements of flows monitored across observation points of an observation domain. Examples of data, common properties, and/or elements incorporated in primary data set 120 include, without limitation, ingress interface indexes, next hop indexes, flow directions, forwarding statuses, data link frame sizes, data link frame selections, gateways, outgoing interfaces (OFs), combinations or variations of one or more of the same, and/or any other suitable data, common properties, and/or elements.

In some examples, primary data set 120 may include, specify, and/or identify one or more common properties identifiers. In such examples, these common properties identifiers may be used to correlate and/or match primary data set 120 with a corresponding secondary data set on an IPFIX collector. Additionally or alternatively, primary data set 120 may include, identify, and/or be presented in a certain format. For example, primary data set 120 may include and/or identify a template (such as an option template) that defines the format of the corresponding data, common properties, and/or elements. In some embodiments, this template may be consistent with the definitions, formats, and/or configurations provided in the Internet Engineering Task Force's (IETF's) RFC 5473, published March of 2009, titled "Reducing Redundancy in IP Flow Information Export (IPFIX) and Packet Sampling (PSAMP) Reports," the entire disclosure of which is incorporated herein by reference.

In some examples, secondary data set 122 may include and/or represent data derived, deduced, and/or extrapolated by the control path, control plane, and/or routing plane of a network device. In one example, secondary data set 122 may include, represent, and/or identify one or more common properties and/or elements of flows monitored across observation domains of an observation cloud. Examples of data, common properties, and/or elements incorporated in secondary data set 122 include, without limitation, egress interface indexes, gateway addresses, Simple Network Management Protocol (SNMP) indexes, interface names, ingress Virtual Routing and Forwarding (VRF) indexes, VRF names, next hop addresses, egress VRF indexes, portions of primary data set 120, ingress interface indexes, next hop indexes, combinations or variations of one or more of the same, and/or any other suitable data, common properties, and/or elements.

In some examples, secondary data set 122 may include, specify, and/or identify one or more common properties identifiers. In such examples, these common properties identifiers may be used to correlate and/or match secondary data set 122 with primary data set 120 on an IPFIX collector. Additionally or alternatively, secondary data set 122 may include, identify, and/or be presented in a certain format. For example, secondary data set 122 may include and/or identify a template (such as an option template) that defines the format of the corresponding data, common properties, and/or elements. In some embodiments, this template may be consistent with the definitions, formats, and/or configurations provided in the IETF's RFC 5473.

As illustrated in FIG. 1, exemplary system 100 may additionally include one or more databases, such as database 124 and database 126. In some examples, databases 124 and 126 may be located on and/or maintained by an IPFIX collector. In one example, database 124 may be dedicated and/or configured to store primary data sets observed by observation domains. Additionally or alternatively, database 126 may be dedicated and/or configured to store secondary data sets derived by observation clouds.

As illustrated in FIG. 1, exemplary system 100 may also include one or more observation points, such as observation points 128. In some examples, observation points 128 may include and/or represent physical devices and/or components that facilitate the flow of traffic within a network. Additionally or alternatively, observation points 128 may be implemented by physical devices and/or components that forward traffic within a network. Examples of such physical devices and/or components include, without limitation, physical interfaces, Gigabit Ethernet (GE) interfaces, 10-Gigabit Ethernet (XE) interfaces, Ten GE interfaces, Asynchronous Transfer Mode (ATM) interfaces, Frame Relay interfaces, egress interfaces, ingress interfaces, communication ports, portions of one or more of the same, combinations or variations of one or more of the same, and/or any other suitable physical devices and/or components.

As illustrated in FIG. 1, exemplary system 100 may further include one or more observation domains, such as observation domain 134. In some examples, observation domain 134 may include and/or represent a set and/or group of observation points. Additionally or alternatively, observation domain 134 may be implemented by physical devices and/or components that forward traffic within a network. In one example, each observation domain may include and/or be assigned a unique observation domain identifier. Examples of such physical devices and/or components include, without limitation, Packet Forwarding Engines (PFEs), Physical Interface Cards (PICs), Flexible PIC Concentrators (FPCs), Switch Interface Boards (SIBs), control boards, connector interface panels, line cards, portions of one or more of the same, combinations or variations of one or more of the same, and/or any other suitable physical devices and/or components.

In some embodiments, these observation points and observation domains may be consistent with the definitions, implementations, and/or configurations provided in the IETF's RFC 5101, published January of 2008, titled "Specification of the IP Flow Information Export (IPFIX) Protocol for the Exchange of IP Traffic Flow Information," the entire disclosure of which is incorporated herein by reference.

In addition, as illustrated in FIG. 1, exemplary system 100 may include one or more observation clouds, such as observation cloud 132. In some examples, observation cloud 132 may include and/or represent a set and/or group of observation domains. Additionally or alternatively, observation cloud 132 may be implemented by physical devices and/or components that route traffic within a network. In one example, each observation cloud may include and/or be assigned a unique observation cloud identifier. Examples of such physical devices and/or components include, without limitation, routing engines, FPCs, routers (such as provider edge routers, hub routers, spoke routers, autonomous system boundary routers, and/or area border routers), switches, hubs, modems, bridges, repeaters, gateways (such as Broadband Network Gateways (BNGs)), portions of one or more of the same, combinations or variations of one or more of the same, and/or any other suitable physical devices and/or components.

An apparatus for offloading IPFIX lookup and translation operations from observation domains may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among network device 206, computing device 202, computing device 208, and/or computing device 210.

As illustrated in FIG. 2, network 204 may include and/or represent various network devices and/or nodes that form and/or establish communication paths and/or segments. For example, network 204 may include a network device 206 that forwards traffic between computing device 202 and computing device 208. In one example, IPFIX exporters implemented on and/or by network device 206 may monitor traffic passing through network 204. In this example, the IPFIX exporters may observe and/or derive common properties of such traffic across observation points and/or observation domains. These IPFIX exporters may export IPFIX data sets from network device 206 to a collector 230 implemented on computing device 210.

In some examples, and as will be described in greater detail below, one or more of modules 102 may cause computing device 210 to (1) receive, by collector 230, at least one IPFIX message from an IPFIX exporter (such as observation domains 134(1)-(N) and/or observation cloud 132) implemented on a network device 206, (2) identify, within the IPFIX message, a data set exported by the IPFIX exporter implemented on the network device 206, (3) identify, within the IPFIX message, a data-level indicator that indicates whether the data set is (A) a primary data set observed by one of observation domains 134(1)-(N) or (B) a secondary data set derived by observation cloud 132, (4) identify, by collector 230, a database (such as database 124 or database 126) that corresponds to the data-level indicator identified within the IPFIX message, (5) store the data set in the database in accordance with the data-level indicator, and then (6) perform at least one action based at least in part on the data set stored in the database.

In some examples, network device 206 and computing device 202, 208, and 210 may each generally represent any type or form of physical computing device capable of reading computer-executable instructions. Examples of network device 206 and computing device 202, 208, and 210 include, without limitation, routers (such as provider edge routers, hub routers, spoke routers, autonomous system boundary routers, and/or area border routers), switches, hubs, modems, bridges, repeaters, gateways (such as BNGs), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable gateway devices.

Network 204 generally represents any medium or architecture capable of facilitating communication or data transfer. In one example, network 204 may include one or more of computing devices 202, 208, and 210 even though these devices are illustrated as being external to network 204 in FIG. 2. Additionally or alternatively, network 204 may include other devices that facilitate communication among network device 206 and/or computing devices 202, 208, and 210. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an exemplary computer-implemented method 300 for offloading IPFIX lookup and translation operations from observation domains. The steps shown in FIG. 3 may be performed by any suitable computer-executable code and/or computing system, including system 100 in FIG. 1, system 200 in FIG. 2, system 400 in FIG. 4, system 1000 in FIG. 10, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive, at an IPFIX collector, at least one IPFIX message from an IPFIX exporter implemented on a remote device. For example, receiving module 104 may, as part of computing device 210 in FIG. 2, receive at least one IPFIX message from an IPFIX exporter implemented on network device 206. In one example, the IPFIX exporter may include and/or represent one of observation domains 134(1)-(N). In this example, observation domains 134(1)-(N) may each be implemented and/or executed by an FPC and/or a line card installed to a routing engine of network device 206.

In another example, the IPFIX exporter may include and/or represent observation cloud 132. In this example, observation cloud 132 may be implemented and/or executed by a routing engine of network device 206. Additionally or alternatively, observation cloud 132 may be implemented and/or executed by a physical processor of network device 206.

The systems described herein may perform step 310 in a variety of ways and/or contexts. In some examples, receiving module 104 may monitor computing device 210 for IPFIX messages arriving from certain network devices within network 204. In one example, the IPFIX exporter implemented on network device 206 may generate an IPFIX message for export to collector 230 implemented on computing device 210. In this example, the IPFIX exporter may direct network device 206 to send the IPFIX message to computing device 210. While monitoring computing device 210 for IPFIX messages, receiving module 104 may receive the IPFIX message as it arrives at collector 230 implemented on computing device 210.

In one example, network device 206 in FIG. 2 may include and/or represent a router deployed within network 204. In this example, observation cloud 132 in FIG. 2 may include and/or represent a routing engine of the router, and observation domains 134(1)-(N) may each include and/or represent a line card installed to the routing engine of the router. Additionally or alternatively, observation points 128(1) may include and/or represent a set of network interfaces incorporated in a first line card, and observation points 128(N) may include and/or represent a set of network interfaces incorporated in a second line card.

Continuing with this example, identification module 106 may identify and/or detect various packets encountered at the network interfaces incorporated on the first line card. In this example, identification module 106 may search portions (e.g., headers, metadata, and/or payloads) of the packets for certain observable properties that those packets share in common. During the search, identification module 106 may identify and/or detect such observable properties in connection with the first line card. Examples of such observation properties include, without limitation, ingress interface indexes, next hop indexes, flow directions, forwarding statuses, data link frame sizes, data link frame selections, combinations or variations of one or more of the same, and/or any other suitable data, common properties, and/or elements.

In one example, identification module 106 may match and/or group the packets to one another at the first line card based at least in part on the observable properties that the packets share in common. This matching and/or grouping of packets may represent and/or constitute a flow across the entire first line card. In this example, identification module 106 may select and/or pick one of the observable properties to serve as a domain-level common properties identifier that is locally unique to the flow and/or the first line card.

In one example, exporter module 112 may generate and/or prepare an IPFIX message in connection with the first line card. In some embodiments, this IPFIX message may identify and/or specify the observable properties that the packets detected and/or observed at the first line card share in common. Additionally or alternatively, this IPFIX message may identify and/or include certain domain-level statistics of the packets detected and/or observed in connection with the first line card. In this example, exporter module 112 may determine such domain-level statistics that account for the packets detected and/or observed in connection with the first line card.

In some examples, exporter module 112 may insert the domain-level common properties identifier, the corresponding observable properties, and/or the domain-level statistics or information into the IPFIX message. In one example, the domain-level common properties identifier, the corresponding observable properties, and/or the domain-level statistics may collectively represent and/or constitute the data set of the IPFIX message.

Additionally or alternatively, exporter module 112 may set and/or configure a data-level indicator within the IPFIX message. This data-level indicator may indicate and/or specify whether the data set of the IPFIX message is a primary or secondary data set. Accordingly, because this IPFIX message originates from the first line card, the data-level indicator of this IPFIX message may be set and/or configured to indicate that the data set exported in the IPFIX message is a primary data set observed by the first line card. Exporter module 112 may then send this IPFIX message to collector 230.

In some examples, the line cards may report to the routing engine certain information and/or statistics about various packets encountered by the respective network interfaces. In these examples, identification module 106 may receive, at the routing engine, notifications with such information and/or statistics from the line cards. For example, the notifications originating from the first line card may indicate that the network interfaces of that line card have detected certain packets that share observable properties in common. Similarly, the notifications originating from the second line card may indicate that the network interfaces of that line card have detected certain packets that share observable properties in common.

In some examples, identification module 106 may search the notifications from the line cards for indications of the observable properties that those packets share in common. During the search, identification module 106 may identify and/or detect such indications of the observable properties. The match and/or grouping of packets may represent and/or constitute a flow across the entire first line card. In this example, identification module 106 may maintain and/or copy the domain-level common properties identifiers from the notifications for use as cloud-level common properties identifiers.

In some examples, identification module 106 may derive, determine, and/or discover additional properties of the packets at the routing engine. In one example, identification module 106 may perform a lookup operation at the routing engine based at least in part on one or more of the observable properties of the packets. For example, identification module 106 may look up the OIF and/or gateway based at least in part on the destination prefix of the flow in question.

Additionally or alternatively, identification module 106 may perform a translation operation at the routing engine based at least in part on one or more of the observable properties of the packets. For example, identification module 106 may translate the looked up OIF and/or gateway based at least in part on the destination prefix of the flow in question. In this example, identification module 106 may be able to derive the additional properties of the packets at the routing engine based at least in part on the lookup operation and/or the translation operation.

In one example, identification module 106 may match and/or group the packets to one another at the routing engine based at least in part on the observable properties that the packets share in common. This matching and/or grouping of packets may represent and/or constitute a flow across the entire routing engine, which includes the first and second line cards. In this example, identification module 106 may maintain and/or copy the domain-level common properties identifiers from the notifications for use as cloud-level common properties identifiers.

In one example, exporter module 112 may generate and/or prepare an IPFIX message in connection with the routing engine. In some embodiments, this IPFIX message may identify and/or specify the derived properties that the packets detected and/or observed across all the line cards installed to the routing engine. Additionally or alternatively, this IPFIX message may identify and/or include certain cloud-level statistics of the packets detected and/or observed across all the line cards installed to the routing engine. In this example, identification module 106 may determine such cloud-level statistics that account for the packets detected and/or observed across all the line cards installed to the routing engine.

In some examples, exporter module 112 may insert the cloud-level common properties identifier, the corresponding derived properties, and/or the cloud-level statistics or information into the IPFIX message. In one example, the cloud-level common properties identifier, the corresponding derived properties, and/or the cloud-level statistics may collectively represent and/or constitute the data set of the IPFIX message. In this example, the cloud-level common properties identifier may enable collector 230 to record the data set as originating from the routing engine.

Additionally or alternatively, exporter module 112 may set and/or configure a data-level indicator within the IPFIX message. This data-level indicator may indicate and/or specify whether the data set of the IPFIX message is a primary or secondary data set. Accordingly, because this IPFIX message originates from the routing engine, the data-level indicator of this IPFIX message may be set and/or configured to indicate that the data set exported in the IPFIX message is a primary data set observed by the first line card. Exporter module 112 may then send this IPFIX message to collector 230.

In some examples, the routing engine may export the common properties identifiers to the line cards. As a result, the line cards may be able to generate and/or export IPFIX messages to collector 230 without performing lookups or translations for the common properties (e.g., the OIF and gateway) of the destination prefix. In other words, the line cards may simply use these common properties identifiers, thereby avoiding lookup and translation.

FIG. 4 is a block diagram of an exemplary system 400 for offloading IPFIX lookup and translation operations from observation domains. As illustrated in FIG. 4, exemplary system 400 may include and/or represent an exporter 410 and collector 230. In some examples, exporter 410 may send an IPFIX message 412 to collector 230. In one example, exporter 410 may be implemented and/or executed on network device 206 in FIG. 2. Additionally or alternatively, collector 230 may be implemented and/or executed on computing device 210 in FIG. 2.

In some examples, exporter 410 may include and/or represent one of observation domains 134(1)-(N) implemented on network device 206 in FIG. 2. In other examples, exporter 410 may include and/or represent observation cloud 132 implemented on network device 206 in FIG. 2.

Figure 5:
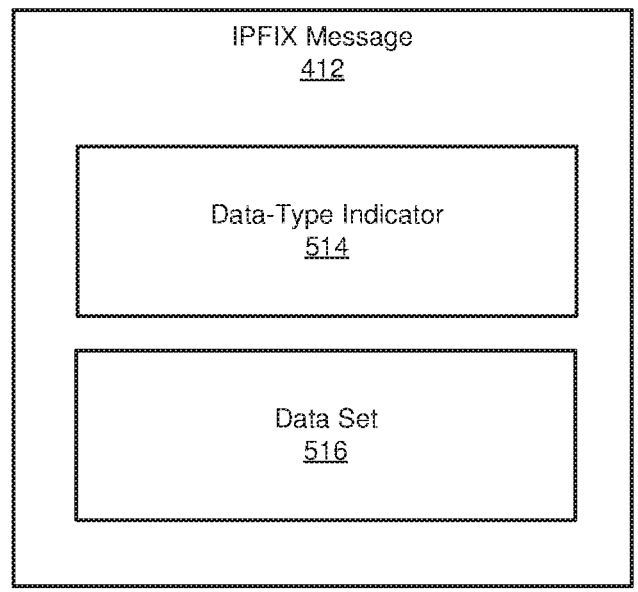
FIG. 5 is an illustration of an exemplary IPFIX message.

FIG. 5 is a block diagram of an exemplary IPFIX message 412. As illustrated in FIG. 5, exemplary IPFIX message 412 may include and/or contain a data-level indicator 514 and a data set 516. In some examples, data-level indicator 514 may include and/or represent a bit of data that indicates to collector 230 whether data set 516 is a primary or secondary data set. Accordingly, data set 516 may include and/or represent a primary data set that originates from one of observation domains 134(1)-(N). Alternatively, data set 516 may include and/or represent a secondary data set that originates from observation cloud 132.

In some examples, IPFIX message 412 may be exported via a variety of different protocols. For example, if IPFIX message 412 carries a primary data set, IPFIX message 412 may be exported using a User Datagram Protocol (UDP) transport session. In this example, IPFIX message 412 may also include and/or contain a header with an observation domain identifier that uniquely corresponds to and/or identifies the observation domain from which IPFIX message 412 originated.

Alternatively, if IPFIX message 412 carries a secondary data set, IPFIX message 412 may be exported using a Transmission Control Protocol (TCP) transport session. In this example, IPFIX message 412 may also include and/or contain a header with an observation cloud identifier that uniquely corresponds to and/or identifies the observation cloud from which IPFIX message 412 originated.

Figure 6:
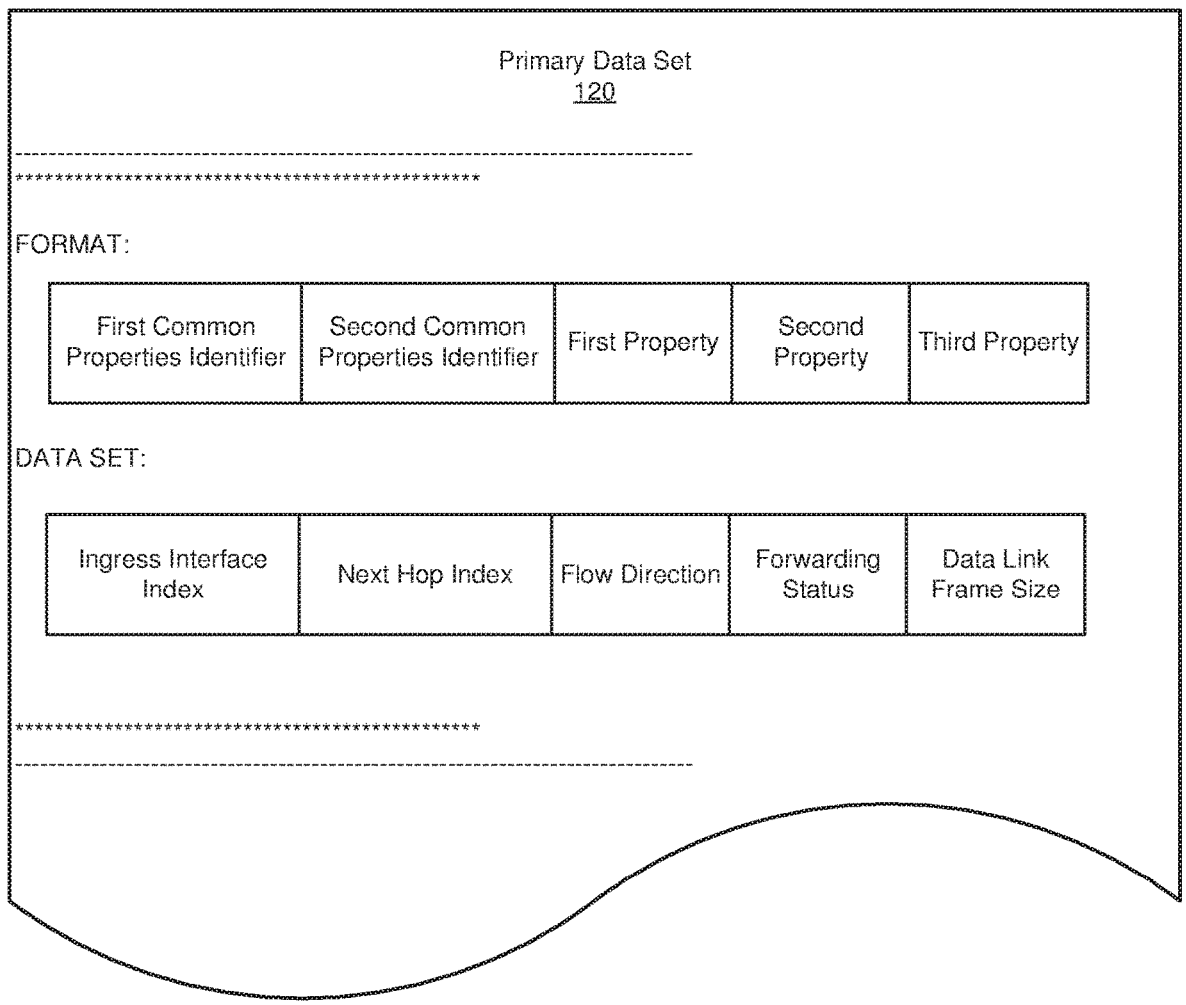
FIG. 6 is an illustration of an exemplary primary data set.

FIG. 6 is an illustration of exemplary primary data set 120. As illustrated in FIG. 6, exemplary primary data set 120 may include and/or contain a data set and/or a format. In one example, the data set may include, represent, and/or identify an ingress interface index, a next hop index, a flow direction, a forwarding status, and/or a data link frame size. In this example, the data set may correspond and/or be specific to a particular flow detected and/or observed at one of observation domains 134(1)-(N). More specifically, the data set may correspond and/or be specific to a particular flow detected and/or observed across various observation points within one of observation domains 134(1)-(N).

In one example, the format of the data set may correspond to and/or be defined by a template. For example, the template may indicate that the format of the data set includes first and second common properties identifiers located in the left-most positions and first, second, and third common properties located in the right-most positions. In this example, exporter module 112 may select the ingress interface index and/or the next hop index to serve as the first and second common properties identifiers, respectively. These common properties identifiers may enable collector 230 to record primary data set 120 as originating from one of observation domains 134(1)-(N). Additionally or alternatively, these common properties identifiers may enable collector 230 to correlate and/or match primary data set 120 to the corresponding secondary data set at a later point in time.

FIG. 7 is an illustration of exemplary secondary data set 122. As illustrated in FIG. 7, exemplary secondary data set 122 may include and/or contain a data set and/or a format.

In one example, the data set may include, represent, and/or identify an ingress interface index, an ingress interface SNMP ID, an ingress interface name, ingress VRF ID, ingress VRF name, a next hop index, an egress interface SNMP ID, an egress interface name, a next hop IPv4 address, an egress VRF ID, and/or an egress VRF name. In this example, the data set may correspond and/or be specific to a particular flow detected and/or observed at observation cloud 132. More specifically, the data set may correspond and/or be specific to a particular flow detected and/or observed across various observation domains 134(1)-(N) included in observation cloud 132. For example, primary data set 120 in FIG. 6 and secondary data set 122 in FIG. 7 may correspond to and/or represent the same flow.

In one example, the format of the data set may correspond to and/or be defined by a template. For example, the template may indicate that the format of the data set includes first and second common properties identifiers located in the left-most positions of a separate data rows. In this example, the template may also indicate that first, second, third, and fourth common properties follow the first common properties identifier in one of the data rows and fifth, sixth, seventh, eighth, and ninth common properties follow the second common properties identifier in another data row.

In one example, exporter module 112 may select the ingress interface index and/or the next hop index to serve as the first and second common properties identifiers. By doing so, exporter module 112 may ensure that the first and second common properties identifiers are the same in both primary data set 120 and secondary data set 122. These common properties identifiers may enable collector 230 to record secondary data set 122 as originating from observation cloud 132. Additionally or alternatively, these common properties identifiers may enable collector 230 to correlate and/or match secondary data set 122 to the corresponding primary data set at a later point in time.

In some examples, network device 206 may install, in a FIB at the routing engine of network device 206, a set of routes capable of carrying and/or forwarding traffic within network 204. Once the set of routes are installed, the set of routes may be considered a full and/or complete FIB. In one example, the routing engine of network device 206 may withhold some of the routes installed in the FIB from each of the line cards such that none of the line cards includes all the routes. By doing so, the routing engine may enable network device 206 to support the IPFIX protocol while also enabling the line cards to operate with less memory capacity than traditional IPFIX technologies.

Returning to FIG. 3, at step 320 one or more of the systems described herein may identify, within the IPFIX message, a data set exported by the IPFIX exporter implemented on the remote device. For example, identification module 106 may, as part of computing device 210 in FIG. 2, identify a data set 516 within IPFIX message 512. In one example, data set 516 may be exported by one of observation domains 134(1)-(N) implemented on network device 206. In this example, data set 516 may be exported by observation cloud 132 implemented on network device 206.

The systems described herein may perform step 320 in a variety of ways and/or contexts. In some examples, identification module 106 may search IPFIX message 412 for any data sets exported from an IPFIX exporter. During the search, identification module 106 may identify data set 516 as being exported by an IPFIX exporter implemented on network device 206. In one example, data set 516 may include and/or represent a primary data set that identifies observable properties of a particular flow encountered across one of observation domains 134(1)-(N). In another example, data set 516 may include and/or represent a second data set that identifies derived properties of a particular flow encountered across observation domains 134(1)-(N) of observation cloud 132.

Returning to FIG. 3, at step 330 one or more of the systems described herein may identify, within the IPFIX message, a data-level indicator that indicates whether the data set is a primary data set observed by an observation domain or a secondary data set derived by an observation cloud. For example, identification module 106 may, as part of computing device 210 in FIG. 2, identify data-level indicator 514 that indicates whether data set 516 is a primary data set observed by an observation domain or a secondary data set derived by an observation cloud. In one example, data-level indicator 514 may indicate that data set 516 was exported by an observation domain. In another example, data-level indicator 514 may indicate that data set 516 was exported by an observation cloud.

The systems described herein may perform step 330 in a variety of ways and/or contexts. In some examples, identification module 106 may search IPFIX message 412 for any indication as to whether data set 516 is a primary or secondary data set. For example, identification module 106 may search the header and/or metadata of IPFIX message 412. During this search, identification module 106 may identify data-level indicator 514. Afterward, collector module 104 may be able to determine whether data set 516 is a primary or secondary data set.

Returning to FIG. 3, at step 340 one or more of the systems described herein may identify, at the IPFIX collector, a database that corresponds to the data-level indicator identified within the IPFIX message. For example, identification module 106 may, as part of computing device 210 in FIG. 2, identify database 124 as corresponding to data-level indicator 514 identified within IPFIX message 412. In this example, data-level indicator 514 may indicate that IPFIX message 412 is carrying a primary data set.

Alternatively, identification module 106 may identify database 126 as corresponding to data-level indicator 514 identified within IPFIX message 412. In this example, data-level indicator 514 may indicate that IPFIX message 412 is carrying a secondary data set.

The systems described herein may perform step 340 in a variety of ways and/or contexts. In some examples, identification module 106 may search IPFIX message 412 for any indication as to whether data set 516 is a primary or secondary data set. For example, identification module 106 may search the header and/or metadata of IPFIX message 412. During this search, identification module 106 may identify data-level indicator 514. Afterward, collector module 104 may be able to determine whether data set 516 is a primary or secondary data set.

Returning to FIG. 3, at step 350 one or more of the systems described herein may store the data set in the database in accordance with the data-level indicator. For example, storage module 108 may, as part of computing device 210 in FIG. 2, store data set 516 in database 124 in accordance with data-level indicator 514. In one example, if data-level indicator 514 indicates that data set 516 is a primary data set, storage module 108 may store data set 516 in database 124. In another example, if data-level indicator 514 indicates that data set 516 is a secondary data set, storage module 108 may store data set 516 in database 126.

The systems described herein may perform step 350 in a variety of ways and/or contexts. In some examples, storage module 108 may copy data set 516 from IPFIX message 412 to database 124 or database 126. Additionally or alternatively, storage module 108 may maintain and/or preserve data set 516 in database 124 or database 126 to facilitate certain actions and/or services based at least in part on the unification of IPFIX exports.

In some examples, modules 102 may repeat any of the steps and/or actions described above in connection with additional IPFIX messages received by collector 230. For example, one or more of modules 102 may cause computing device 210 to (1) receive, by collector 230, at least one additional IPFIX message from an IPFIX exporter (such as observation domains 134(1)-(N) and/or observation cloud 132) implemented on network device 206, (2) identify, within the additional IPFIX message, a data set exported by the IPFIX exporter implemented on the network device 206, (3) identify, within the additional IPFIX message, an additional data-level indicator that indicates whether the data set is (A) a primary data set observed by one of observation domains 134(1)-(N) or (B) a secondary data set derived by observation cloud 132, (4) identify, by collector 230, a database (such as database 124 or database 126) that corresponds to the data-level indicator identified within the IPFIX message, and then (5) store the data set in the database in accordance with the data-level indicator.

In some examples, collector 230 may include, provide, and/or deploy a union layer, such as union module 114, that performs and/or executes a union of database 124 and database 126. In one example, the union performed by union module 114 may involve identifying one or more common properties identifiers included in primary data set 120. In this example, the union may also involve searching database 126 for secondary data set 122 based at least in part on the common properties identifier(s).

Additionally or alternatively, the union performed by union module 114 may involve identifying one or more common properties identifiers included in secondary data set 122. In this example, the union may also involve searching database 124 for primary data set 120 based at least in part on the common properties identifier(s). In addition, the union may involve creating a record that unifies and/or joins primary data set 120 and secondary data set 122 based at least in part on the common properties identifier.

As a specific example, union module 114 may identify the ingress interface index and the next hop index as the first and second common properties identifier of a particular flow. In this example, union module 114 may search database 124 and/or database 126 for any entries that include and/or identify the same ingress interface index and the next hop index. By doing so, union module 114 may be able to correlate and/or match one entry from database 124 and another entry from database 126 based at least in part on the ingress interface index and the next hop index.

Continuing with this example, union module 114 may create a record 800 in FIG. 8. As illustrated in FIG. 8, record 800 may include and/or represent a unified data set formed from the union of primary data set 120 and secondary data set 122. For example, the unified data set may include, represent, and/or identify the ingress interface index SNMP ID, the ingress interface name, the ingress VRF name, the egress interface SNMP ID, the egress interface name, the flow direction, the forwarding status, and/or the data link size frame of the flow in question.

Figure 9:
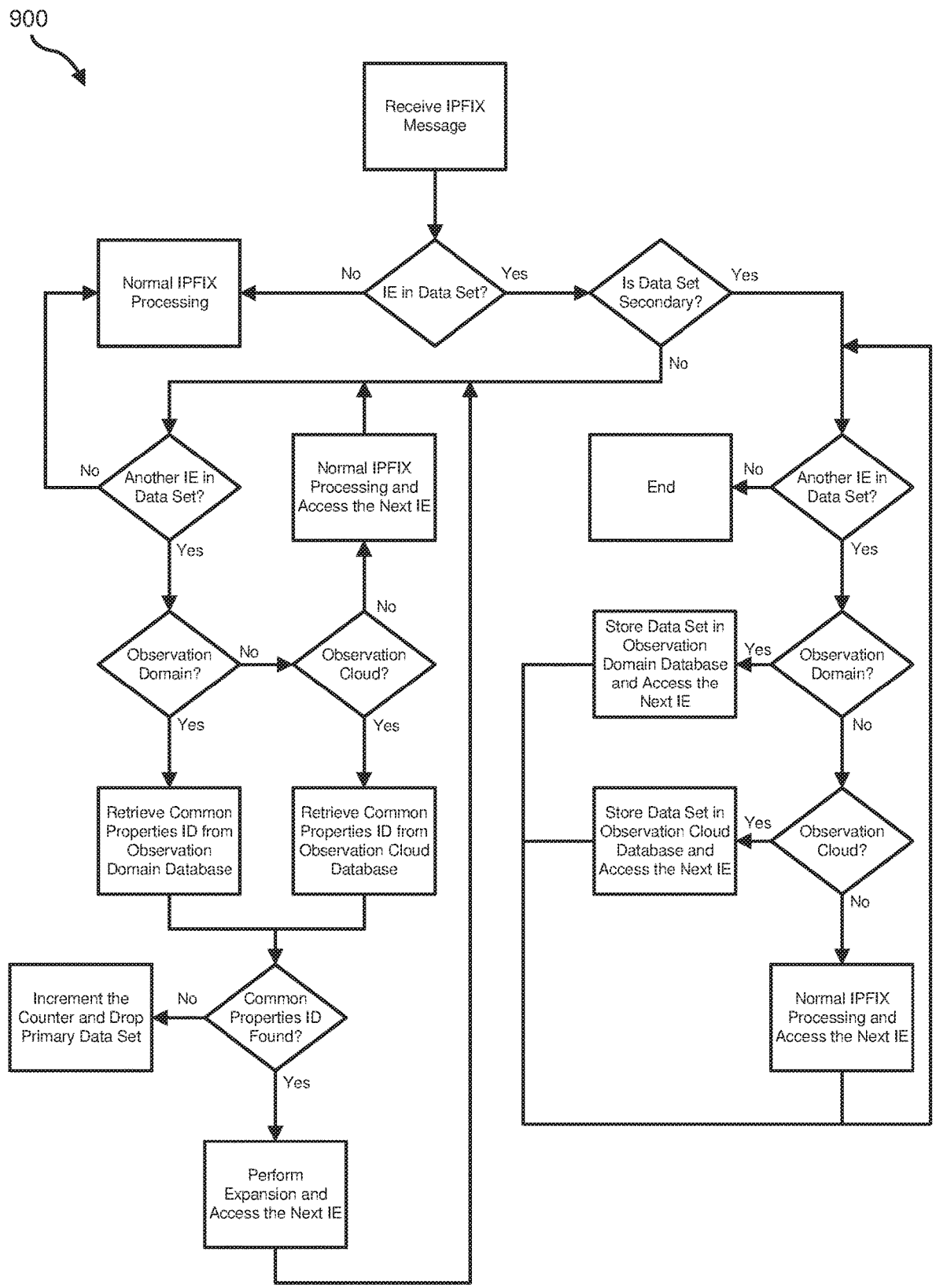
FIG. 9 is a flow diagram of an exemplary method for collecting and unifying exported IPFIX data.

FIG. 9 is flow diagram of an exemplary computer-implemented method 900 for storing and/or unifying primary and secondary data sets at an IPFIX collector. The steps shown in FIG. 9 may be performed by any suitable computer-executable code and/or computing system, including system 100 in FIG. 1, system 200 in FIG. 2, system 400 in FIG. 4, system 1000 in FIG. 10, and/or variations or combinations of one or more of the same. In one example, each of the steps shown in FIG. 9 may represent an algorithm whose structure includes and/or is represented by multiple sub-steps.

As illustrated in FIG. 9, collector 230 may receive an IPFIX message and then determine whether the IPFIX message includes an information element in the data set. If the IPFIX message does include an information element in the data set, collector 230 may determine whether the data set is a primary or secondary data set. If it is a secondary data set, collector 230 may determine whether the data set originated from an observation domain or an observation cloud. On the one hand, if the data set originated from an observation domain, collector 230 may store the information element in an observation domain database and then access the next information element in the dataset. On the other hand, if the data set originated from an observation cloud, collector 230 may store the information element in an observation cloud database and then access the next information element in the dataset.

If it is a primary data set, collector 230 may determine whether the data set originated from an observation domain or an observation cloud. On the one hand, if the data set originated from an observation domain, collector 230 may retrieve the common properties identifier from the observation domain database. On the other hand, if the data set originated from an observation cloud, collector 230 may retrieve the common properties identifier from the observation cloud database.

If the common properties identifier is found, collector 230 may expand at least one of the data sets stored in the databases (e.g., the primary data set stored in the observation domain database) to include and/or represent the union and/or combination of the primary data set and the secondary data set. Accordingly, the resulting entry and/or record in the database may be complete and/or whole. If, however, the common properties identifier is not found, collector 230 may increment the counter and/or drop the primary data set.

If the data set did not originate from either an observation domain or an observation cloud, collector 230 may perform and/or execute normal IPFIX processing on the information element and then access the next information element in the data set. Afterward, collector 230 may repeat the foregoing steps for each information element included in the data set until completion of the processing of the entire data set.

Returning to FIG. 3, at step 360 one or more of the systems described herein may perform at least one action based at least in part on the data set stored in the database. For example, action module 110 may, as part of computing device 210 in FIG. 2, perform at least one action based at least in part on the data set stored in database 124 and/or database 126. Examples of such actions include, without limitation, traffic metering, traffic profiling, security evaluations, intrusion detection, accounting services, billing services, combinations or variations of one or more of the same, and/or any other suitable actions.

As explained above in connection with FIGS. 1-9, the various systems and methods described herein may be able to offload IPFIX lookup and translation operations from observation domains to observation clouds. ASIC lookups and translations are very costly for IPFIX exporters. For any derived fields of an IP prefix, an IPFIX exporter may need to perform a lookup and a translation. However, for any observed fields of an IPFIX prefix, an IPFIX exporter may now be able to avoid performing a lookup and a translation. Accordingly, to facilitate IPFIX exports without forcing ASIC lookups and translation on observation domains, the duties of exporting data to an IPFIX collector may be divided among the observation domains and an observation cloud that includes a complete FIB table. In this example, the observation cloud may be able to perform lookups and translations based at least in part on the destination prefix instead of the observation domains. As a result, the observation domains need not download the complete FIB table, nor do the observation domains need to have the memory capacity to store the complete FIB table.

In one example, the source address and destination address may match across 100,000 flows encountered and/or observed at a router. In this example, a routing engine of the router may export the common properties identifier as a primary data set. Additionally or alternatively, the OIF and gateway may be common across all line cards installed to the routing engine. In this example, the routing engine of the router may export those matching common properties. That way, each line card installed to the routing engine may not need to export those matching common properties individually. Accordingly, the routing engine of the router may be able to export common properties to avoid downloading the complete FIB table to each line card.

In one example, the routing engine may be able to export the common properties identifiers to the line cards so that, when the line cards generate or export IPFIX packets to the collector, the line cards need not perform lookups or translations for the OIF and gateway of the destination prefix. In this example, the line cards may simply use these common properties identifiers, thereby avoiding lookup and translation. This division of IPFIX export duties may enable certain modern ASIC chipsets incorporated into line cards to still contribute and/or support the IPFIX protocol.

In some examples, each line card installed to the routing engine of the router may export IPFIX messages. In such examples, these IPFIX messages may each include a header with a field for the corresponding observation domain identifier. This observation domain identifier may uniquely identify and/or specify the exporting line card.

Similarly, the routing engine of the router may export IPFIX messages. In such examples, these IPFIX messages may each include a header with a field for the corresponding observation cloud identifier. This observation cloud identifier may uniquely identify and/or specify the exporting routing engine.

In one example, the collector may maintain two databases, one for primary data sets and another one for secondary data sets. In this example, the primary data sets may arrive at the collector via IPFIX messages exported by observation domains (e.g., line cards and/or PFE instances running on the line cards). In contrast, the secondary data sets may arrive at the collector via IPFIX messages exported by observation clouds (e.g., routing engines and/or routers). The collector may perform lookups based on the common properties identifiers to combine and/or unify the primary and secondary data sets. The collector may then create a unified and/or combined record with the primary and secondary data sets.

Figure 10:
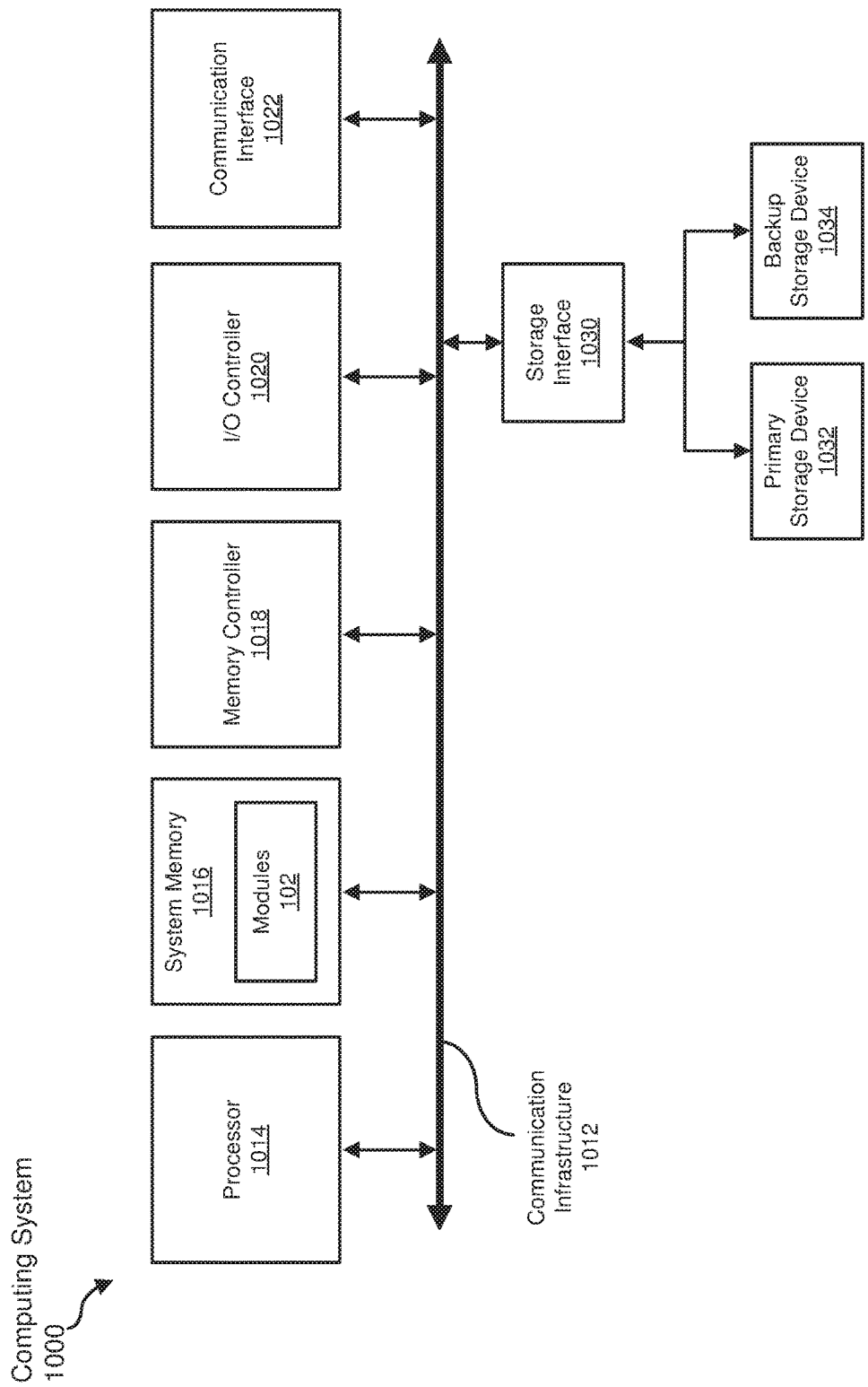
FIG. 10 is a block diagram of an exemplary computing system capable of implementing and/or being used in connection with one or more of the embodiments described and/or illustrated herein.

FIG. 10 is a block diagram of an exemplary computing system 1000 capable of implementing and/or being used in connection with one or more of the embodiments described and/or illustrated herein. In some embodiments, all or a portion of computing system 1000 may perform and/or be a means for performing, either alone or in combination with other elements, one or more of the steps described in connection with FIG. 3. All or a portion of computing system 1000 may also perform and/or be a means for performing and/or implementing any other steps, methods, or processes described and/or illustrated herein.

Computing system 1000 broadly represents any type or form of electrical load, including a single or multi-processor computing device or system capable of executing computer-readable instructions. Examples of computing system 1000 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1000 may be programmed, configured, and/or otherwise designed to comply with one or more networking protocols. According to certain embodiments, computing system 1000 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1000 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1000 may include various network and/or computing components. For example, computing system 1000 may include at least one processor 1014 and a system memory 1016. Processor 1014 generally represents any type or form of processing unit capable of processing data or interpreting and executing instructions. For example, processor 1014 may represent an ASIC, a system on a chip (e.g., a network processor), a hardware accelerator, a general purpose processor, and/or any other suitable processing element.

Processor 1014 may process data according to one or more of the networking protocols discussed above. For example, processor 1014 may execute or implement a portion of a protocol stack, may process packets, may perform memory operations (e.g., queuing packets for later processing), may execute end-user applications, and/or may perform any other processing tasks.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1000 may include both a volatile memory unit (such as, for example, system memory 1016) and a non-volatile storage device (such as, for example, primary storage device 1032, as described in detail below).

System memory 1016 may be implemented as shared memory and/or distributed memory in a network device. Furthermore, system memory 1016 may store packets and/or other information used in networking operations.

In certain embodiments, exemplary computing system 1000 may also include one or more components or elements in addition to processor 1014 and system memory 1016. For example, as illustrated in FIG. 10, computing system 1000 may include a memory controller 1018, an Input/Output (I/O) controller 1020, and a communication interface 1022, each of which may be interconnected via communication infrastructure 1012. Communication infrastructure 1012 generally represents any type or form of infrastructure capable of facilitating communication between one or more components of a computing device. Examples of communication infrastructure 1012 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1018 generally represents any type or form of device capable of handling memory or data or controlling communication between one or more components of computing system 1000. For example, in certain embodiments memory controller 1018 may control communication between processor 1014, system memory 1016, and I/O controller 1020 via communication infrastructure 1012. In some embodiments, memory controller 1018 may include a Direct Memory Access (DMA) unit that may transfer data (e.g., packets) to or from a link adapter.

I/O controller 1020 generally represents any type or form of device or module capable of coordinating and/or controlling the input and output functions of a computing device. For example, in certain embodiments I/O controller 1020 may control or facilitate transfer of data between one or more elements of computing system 1000, such as processor 1014, system memory 1016, communication interface 1022, and storage interface 1030.

Communication interface 1022 broadly represents any type or form of communication device or adapter capable of facilitating communication between exemplary computing system 1000 and one or more additional devices. For example, in certain embodiments communication interface 1022 may facilitate communication between computing system 1000 and a private or public network including additional computing systems. Examples of communication interface 1022 include, without limitation, a link adapter, a wired network interface (such as a network interface card), a wireless network interface (such as a wireless network interface card), and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1022 may also represent a host adapter configured to facilitate communication between computing system 1000 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also enable computing system 1000 to engage in distributed or remote computing. For example, communication interface 1022 may receive instructions from a remote device or send instructions to a remote device for execution.

As illustrated in FIG. 10, exemplary computing system 1000 may also include a primary storage device 1032 and/or a backup storage device 1034 coupled to communication infrastructure 1012 via a storage interface 1030. Storage devices 1032 and 1034 generally represent any type or form of storage device or medium capable of storing data and/or other computer-readable instructions. For example, storage devices 1032 and 1034 may represent a magnetic disk drive (e.g., a so-called hard drive), a solid state drive, a floppy disk drive, a magnetic tape drive, an optical disk drive, a flash drive, or the like. Storage interface 1030 generally represents any type or form of interface or device for transferring data between storage devices 1032 and 1034 and other components of computing system 1000.

In certain embodiments, storage devices 1032 and 1034 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1034 may also include other similar structures or devices for allowing computer software, data, or other computer-readable instructions to be loaded into computing system 1000. For example, storage devices 1032 and 1034 may be configured to read and write software, data, or other computer-readable information. Storage devices 1032 and 1034 may be a part of computing system 1000 or may be separate devices accessed through other interface systems.

Many other devices or subsystems may be connected to computing system 1000. Conversely, all of the components and devices illustrated in FIG. 10 need not be present to practice the embodiments described and/or illustrated herein. The devices and subsystems referenced above may also be interconnected in different ways from those shown in FIG. 10. Computing system 1000 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, at an Internet Protocol Flow Information Export (IPFIX) collector, at least one IPFIX message from an IPFIX exporter implemented on a remote device;
   identifying, within the IPFIX message, a data set exported by the IPFIX exporter implemented on the remote device;
   identifying, within the IPFIX message, a data-level indicator that indicates whether the data set is:
      a primary data set observed by one or more line cards installed to a routing engine of the remote device; or
      a secondary data set derived by the routing engine of the remote device;
   identifying, at the IPFIX collector, a plurality of databases that includes a database dedicated to storing the primary data set observed by the one or more line cards and another database dedicated to storing the secondary data set derived by the routing engine;
   selecting one of the plurality of databases to store the data set in accordance with the data-level indicator; and
   performing at least one action based at least in part on the data set stored in the one of the plurality of databases.

2. The method of claim 1, further comprising:
   receiving, at the IPFIX collector, at least one additional IPFIX message from an additional IPFIX exporter implemented on the remote device;
   identifying, within the additional IPFIX message, an additional data set exported by the additional IPFIX exporter implemented on the remote device;
   identifying, within the additional IPFIX message, an additional data-level indicator that indicates whether the additional data set is:
      a primary data set observed by the one or more line cards installed to the routing engine of the remote device; or
      a secondary data set derived by the routing engine of the remote device; and
   selecting another one of the plurality of databases to store the additional data set in accordance with the additional data-level indicator.

3. The method of claim 2, further comprising providing, at the IPFIX collector, a union layer that performs a union of the plurality of databases.

4. The method of claim 3, wherein performing the union of the plurality of databases comprises:
   identifying, within the IPFIX message, a common properties identifier included in the data set exported by the IPFIX exporter;
   searching the another one of the plurality of databases for the additional data set based at least in part on the common properties identifier; and
   creating a record that unifies the data set and the additional data set based at least in part on the common properties identifier.

5. The method of claim 3, wherein performing the union of the plurality of databases comprises:
   identifying, within the additional IPFIX message, a common properties identifier included in the additional data set exported by the additional IPFIX exporter;
   searching the one of the plurality of databases for the data set based at least in part on the common properties identifier; and
   creating a record that unifies the data set and the additional data set based at least in part on the common properties identifier.

6. The method of claim 2, wherein:
   the data-level indicator indicates that the data set is a primary data set observed by the one or more line cards installed to the routing engine of the remote device; and
   the additional data-level indicator indicates that the additional data set is a secondary data set derived by the routing engine of the remote device.

7. The method of claim 2, wherein:

the one or more line cards each comprise a set of observation points that observe traffic traversing a network.

8. The method of claim 7, wherein:
the remote device comprises a router.

9. The method of claim 8, wherein the observation points comprise a set of network interfaces included on the one or more line cards installed to the routing engine of the router; and further comprising:
detecting, at the network interfaces included on the one or more line cards, a plurality of packets traversing the network;
identifying, within the packets, one or more observable properties that the packets share in common;
matching the packets to one another based at least in part on the observable properties that the packets share in common;
generating, by the one or more line cards, the IPFIX message such that the IPFIX message specifies that observable properties that the packets share in common; and
sending, by the one or more line cards, the IPFIX message to the IPFIX collector.

10. The method of claim 9, wherein:
the data set comprises at least one domain-level statistic of the packets detected at the network interfaces included on the one or more line cards; and
generating the IPFIX message comprises inserting, into the IPFIX message, the domain- level statistic of the packets detected at the network interfaces included on the one or more line cards.

11. The method of claim 9, further comprising:
selecting, from the observable properties that the packets share in common, an observable property to serve as a domain-level common properties identifier that is locally unique to a line card included in the one or more line cards; and
generating the IPFIX message comprises inserting, into the IPFIX message, the domain-level common properties identifier to enable the IPFIX collector to record the data set as originating from the line card.

12. The method of claim 9, wherein generating the IPFIX message comprises setting, within the IPFIX message, the data-level indicator to indicate that the data set is a primary data set observed by the one or more line cards installed to the routing engine of the router.

13. The method of claim 9, further comprising:
receiving, at the routing engine of the router, a notification from a line card included in the one or more line cards, wherein the notification indicates that the network interfaces included on the line card linc cards have detected the packets that share the observable properties in common;
deriving a plurality of additional properties of the packets by performing at least one of:
a lookup operation based at least in part on one of the observable properties that the packets share in common; and
a translation operation based at least in part on one of the observable properties that the packets share in common;
generating, by the routing engine of the router, the additional IPFIX message such that the additional IPFIX message specifies the derived additional properties that the packets share in common; and sending, by the routing engine of the router, the additional IPFIX message to the IPFIX collector.

14. The method of claim 13, further comprising:
receiving, at the routing engine of the router, an additional notification from an additional line card included in the one or more line cards, wherein the additional notification indicates that additional network interfaces included on the additional line card have detected additional packets that share the observable properties in common; and
determining at least one cloud-level statistic that accounts for the packets detected at the network interfaces included on the additional line card and the additional packets detected at the additional network interfaces included on the additional line card.

15. The method of claim 14, wherein:
the additional data set comprises the cloud-level statistic that accounts for the packets detected at the network interfaces included on the line card and the additional packets detected at the additional network interfaces included on the additional line card; and
generating the additional IPFIX message comprises inserting, into the additional IPFIX message, the cloud-level statistic that accounts for the packets detected at the network interfaces included on the line card and the additional packets detected at the additional network interfaces included on the additional line card.

16. The method of claim 13, further comprising:
selecting, from the derived additional properties of the packets, a derived additional property to serve as a cloud-level common properties identifier that is locally unique to the routing engine of the router; and
generating the additional IPFIX message comprises inserting, into the additional IPFIX message, the cloud-level common properties identifier to enable the IPFIX collector to record the additional data set as originating from the routing engine of the router.

17. The method of claim 13, wherein generating the additional IPFIX message comprises setting, within the additional IPFIX message, the additional data-level indicator to indicate that the additional data set is a secondary data set derived by the routing engine of the router.

18. The method of claim 8, further comprising:
installing, in a Forwarding Information Base (FIB) at the routing engine of the router, a set of routes capable of carrying the traffic; and
withholding, by the routing engine of the router, one or more of the routes installed in the FIB from each of the one or more line cards such that none of the one or more line cards includes all the routes.

19. A system comprising:
at least one memory device that stores an Internet Protocol Flow Information Export (IPFIX) collector comprising a collector module, an identification module, a storage module, and an action module, wherein:
the collector module of the IPFIX collector receives at least one IPFIX message from an IPFIX exporter implemented on a remote device;
the identification module of the IPFIX collector:
identifies, within the IPFIX message, a data set exported by the IPFIX exporter implemented on the remote device;
identifies, within the IPFIX message, a data-level indicator that indicates whether the data set is:
a primary data set observed by one or more line cards installed to a routing engine of the remote device; or a secondary data set derived by the routing engine of the remote device;

identifies, at the IPFIX collector, a plurality of databases that includes a database dedicated to storing the primary data set observed by the one or more line cards and another database dedicated to storing the secondary data set derived by the routing engine;

the storage module of the IPFIX collector selects one of the plurality of databases to store the data set in accordance with the data-level indicator;

the action module performs at least one action based at least in part on the data set stored in the one of the plurality of databases; and at least one physical processor configured to execute the collector module, the identification module, the storage module, and the action module.

20. A non-transitory computer-readable medium comprising one or more computer-executable instructions that, when executed by at least one processor of a computing device, cause the computing device to:

receive, by an Internet Protocol Flow Information Export (IPFIX) collector, at least one IPFIX message from an IPFIX exporter implemented on a remote device;

identify, within the IPFIX message, a data set exported by the IPFIX exporter implemented on the remote device;

identify, within the IPFIX message, a data-level indicator that indicates whether the data set is:
  a primary data set observed by one or more line cards installed to a routing engine of the remote device; or
  a secondary data set derived by the routing engine of the remote device;

identify, at the IPFIX collector, a plurality of databases that includes a database dedicated to storing the primary data set observed by the one or more line cards and another database dedicated to storing the secondary data set derived by the routing engine;

select one of the plurality of databases to store the data set in accordance with the data-level indicator; and perform at least one action based at least in part on the data set stored in the plurality of databases.

* * * * *